(12) United States Patent
Kubo et al.

(10) Patent No.: US 7,506,201 B2
(45) Date of Patent: *Mar. 17, 2009

(54) SYSTEM AND METHOD OF REPAIR MANAGEMENT FOR RAID ARRAYS

(75) Inventors: Robert A. Kubo, Tucson, AZ (US); Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 11/467,869

(22) Filed: Aug. 28, 2006

(65) Prior Publication Data

US 2008/0126850 A1 May 29, 2008

(51) Int. Cl.
*G06F 11/00* (2006.01)

(52) U.S. Cl. ............................................. 714/6; 714/7
(58) Field of Classification Search ........................ 714/6
See application file for complete search history.

(56) References Cited

U.S. PATENT DOCUMENTS

| | | | |
|---|---|---|---|
| 5,390,327 A | 2/1995 | Lubbers et al. | |
| 5,522,031 A | 5/1996 | Ellis et al. | |
| 5,696,933 A | 12/1997 | Itoh et al. | |
| 5,848,229 A | 12/1998 | Morita | |
| 5,913,927 A | 6/1999 | Nagaraj et al. | |
| 6,243,827 B1 | 6/2001 | Renner, Jr. | |
| 6,636,984 B1 | 10/2003 | McBrearty et al. | |
| 7,013,373 B2 | 3/2006 | Mimatsu et al. | |
| 7,013,408 B2 | 3/2006 | Knapp, III | |
| 7,069,381 B1 | 6/2006 | Kiselev et al. | |
| 7,254,754 B2 * | 8/2007 | Hetzler et al. | 714/710 |
| 2003/0231529 A1 * | 12/2003 | Hetrick et al. | 365/200 |
| 2004/0030826 A1 * | 2/2004 | Knapp, III | 711/112 |
| 2004/0123179 A1 * | 6/2004 | Dragomir-Daescu et al. | 714/1 |
| 2004/0181641 A1 * | 9/2004 | Nguyen et al. | 711/162 |
| 2007/0109883 A1 * | 5/2007 | Elliott et al. | 365/200 |
| 2007/0113006 A1 * | 5/2007 | Elliott et al. | 711/114 |
| 2007/0168703 A1 * | 7/2007 | Elliott et al. | 714/6 |
| 2007/0220318 A1 * | 9/2007 | Kalos et al. | 714/13 |

* cited by examiner

*Primary Examiner*—Scott T. Baderman
*Assistant Examiner*—Kamini Patel
(74) *Attorney, Agent, or Firm*—John A. Griffiths, PLLC

(57) ABSTRACT

A storage array disposed in a data storage system is reconfigured. A data storage system is supplied comprising a plurality of data storage devices, wherein each of the plurality of data storage devices is assigned to one of a plurality of data storage arrays, or is assigned as a spare device. An unassigned data storage device is detected. If any of the plurality of data storage arrays comprises an intermixed data storage array, the storage array is reconfigured to restore the intermixed data storage array to a homogeneous technology class comprising the unassigned device. If any of the plurality of data storage arrays comprises a degraded data storage array, the storage array is reconfigured to restore the degraded storage array to optimal reliability, optimal performance, and optimal efficiency.

20 Claims, 10 Drawing Sheets

SYSTEM AND METHOD OF REPAIR MANAGEMENT FOR RAID ARRAYS

FIELD OF THE INVENTION

This invention relates to an apparatus and method to reconfigure a storage array disposed in a data storage system.

BACKGROUND OF THE INVENTION

Data storage systems are used to store information provided by one or more host computer systems. Such data storage systems receive requests to write information to a plurality of data storage devices, and requests to retrieve information from that plurality of data storage devices. It is known in the art to configure the plurality of data storage devices into two or more storage arrays.

Storage system vendors have begun providing the availability of high-capacity, low-cost storage class devices (nearline class storage devices such as serial-advanced technology attachment (SATA) and fibre channel advanced technology attachment (FATA) which typically have lower reliability characteristics than the more traditional server class devices (FC-AL, SCSI, SAS, SSA) with larger capacity per device. When such devices are intermixed within a data storage system, it may result in an intermix of storage device technologies that have differing reliability characteristics within the same global sparing domain.

When these devices are intermixed within the same global sparing domain, it is possible that even in systems that disallow intermix of storage technology classes during array creation due to storage devices failures a RAID array will contain devices of an intermix of storage technology classes. The operation of a RAID array with an intermix of storage device technology classes can be problematic due to the difference in reliability characteristics of the devices. The difference in the Mean Time Between Failure (MTBF) and performance (resulting data transfer rates of a device in different IO workloads) between the storage device technology classes may result in array performance degradation and/or increased exposure to data loss from subsequent storage device failures.

What is needed is an apparatus and method to reconfigure one or more of the storage arrays when an unassigned data storage device is detected in the data storage system. Additionally, what is needed is a method of reconfiguration providing a policy that establishes a priority to restoring the reliability of a RAID array to optimum during a repair action where an eligible storage device has been repaired.

SUMMARY OF THE INVENTION

Applicants' invention comprises a method to reconfigure a storage array disposed in a data storage system. The method supplies a data storage system comprising a plurality of data storage devices, wherein each of the plurality of data storage devices is assigned to one of a plurality of data storage arrays, or is assigned as a spare device. The method then detects an unassigned data storage device, and determines if any of the plurality of data storage arrays comprises a degraded data storage array.

If the method determines that any of the plurality of data storage arrays comprises a degraded data storage array, then the method determines if the unassigned data storage device can be used to restore the degraded data storage array to optimal reliability, optimal performance, and optimal efficiency. If the method determines that the unassigned data storage device can be used restore the degraded array to an array comprising optimal reliability, optimal performance, and optimal efficiency, then the method reconfigures the degraded data storage array to a homogeneous technology class comprising the unassigned data storage device.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in a data storage system which comprises two clusters, each cluster comprising a plurality of device adapters and a data cache. The following description of Applicants' method is not meant, however, to limit Applicants' invention to storage system comprising multiple clusters, as the invention herein can be generally applied to reconfiguring one or more storage arrays disposed in a data storage system.

Figure 1:
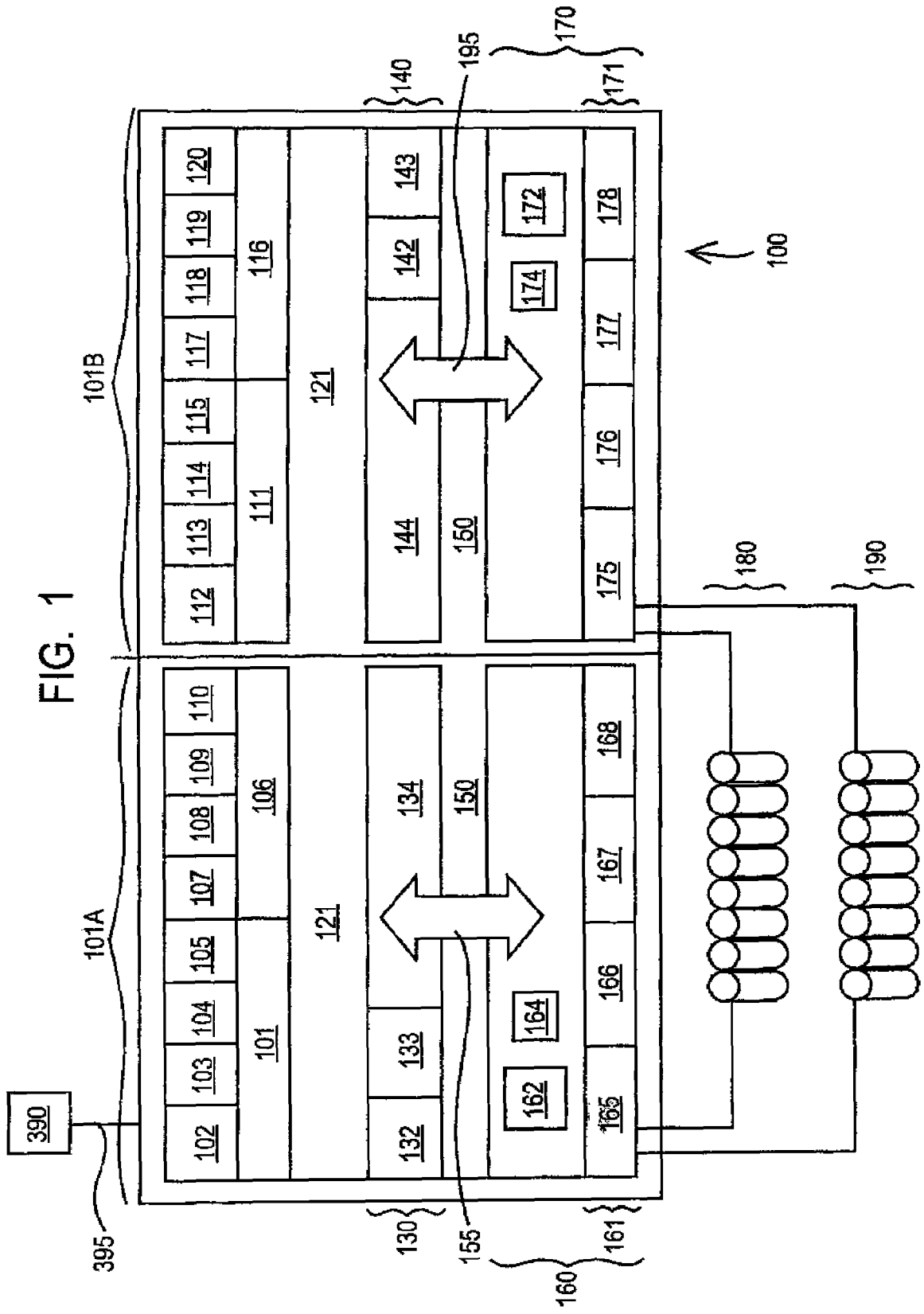
FIG. 1 is a block diagram showing one embodiment of Applicants' data storage system.

Referring now to FIG. 1, data storage system 100 is capable of communication with host computer 390 via communication link 395. The illustrated embodiment of FIG. 1 shows a single host computer. In other embodiments, Applicants' data storage system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage system, such as the IBM DFSMS implemented in the IBM MVS operating system.

In certain embodiments, Applicants' data storage system includes a plurality of host adapters. In the illustrated embodiment of FIG. 1, system 100 comprises host adapters 102-105, 107-110, 112-115 and 117-120. In other embodiments, Applicants' data storage system includes fewer than 16 host adapters. In still other embodiments, Applicants' data storage system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Each host adapter may comprise one or more Fibre Channel ports, one or more FICON ports, one or more ESCON ports, or one or more SCSI ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' data storage system. Similarly, in certain embodiments, one or more host adapters, processor portion 140, one or more device adapters are disposed on a second control card disposed in Applicants' data storage system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
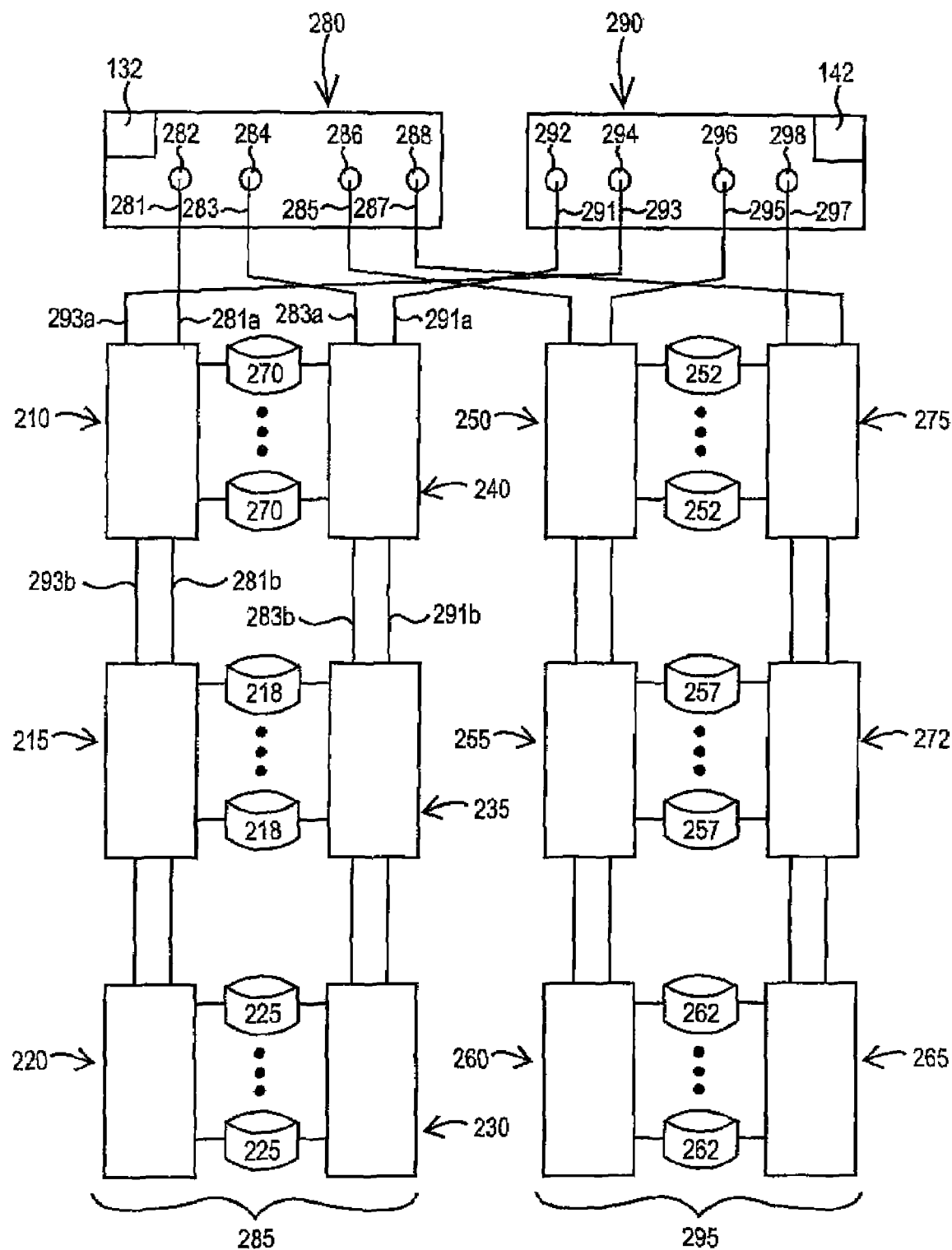
FIG. 2 is a block diagram showing the data storage system of FIG. 1 comprising two fiber channel arbitrated loops.

In the illustrated embodiment of FIG. 2, Applicants' data storage system comprises two dual fibre channel arbitrated ("FC-AL") loops of switches 285 and 295, wherein controllers 280 and 290 are each interconnected to each of the two FC-AL loops. Controller 280 comprises processor 132 (FIGS. 1, 2) and device adapters interface ports 282, 284, 286, and 288. Controller 290 comprises processor 142 (FIGS. 1, 2) and device adapters interface ports 292, 294, 296, and 298. The illustrated embodiment of FIG. 2 should not be construed to limit Applicants' invention to use of fibre channel networks or devices. The recitation of two FC-AL loops the illustrated embodiment of FIG. 2 comprises one embodiment of Applicants' apparatus. In other embodiments, other network topologies and devices are utilized, including without limitation SAS devices and/or SATA devices.

Each FC-AL loop contains a plurality of local controllers. For example, FC-AL loop 285 comprises local controllers 210, 215, 220, 230, 235, and 240. FC-AL loop 295 comprises local controllers 250, 255, 260, 265, 272, and 275.

Each local controller comprises a switch and a processor. In certain embodiments, the switch comprises a Fibre Channel switch. In certain embodiments, the processor comprises a SES processor. In certain embodiments, Applicants' apparatus further includes a midplane interconnecting one or more switches to one or more data storage devices. In the illustrated embodiment of FIG. 3, local controller 210 (FIGS. 2, 3, 4) comprises Fibre Channel switch 214 (FIGS. 3, 4A, 4B, 4C) and SES processor 212 (FIGS. 3, 4A, 4B, 4C). A plurality of communication links 320 interconnect Fibre Channel switch 214 to midplane 310. A plurality of communication links 340 (FIGS. 3, 4A, 4B, 4C) interconnect data storage devices 270 (FIGS. 2, 3) with midplane 310 (FIGS. 3, 4A, 4B, 4C).

Local controller 240 (FIGS. 2, 3, 4A, 4B, 4C) comprises Fibre Channel switch 244 (FIGS. 3, 4A, 4B, 4C) and SES processor 242 (FIGS. 3, 4A, 4B, 4C). A plurality of communication links 330 (FIGS. 3, 4A, 4B, 4C) interconnect Fibre Channel switch 244 to midplane 310.

Signals are provided by switch 214 to data storage devices 270 via communication links 320, communication links 340, and midplane 310. Similarly, signals are provided by switch 244 to data storage devices 270 via communication links 330, communication links 340, and midplane 310.

In certain embodiments, the pluralities of data storage devices 218, 225, 252, 257, 262, and 270, are configured into a plurality of storage arrays. In certain embodiments, one or more of that plurality of storage arrays are configured to utilize one or more RAID protocols, i.e. one or more RAID arrays.

Referring once again to FIG. 2, in certain embodiments, such a RAID array comprises a plurality of data storage devices interconnected with the same local controller, such as for example local controller 210. In certain embodiments, such a RAID array comprises a plurality of data storage devices interconnected with two or more local controllers, such as for example local controllers 210 and 215, interconnected with the same FC-AL loop, such as FC-AL loop 285. In certain embodiments, such a RAID array comprises a plurality of data storage devices interconnected with two or more local controllers, such as for example local controllers 210 and 275, wherein those local controllers are interconnected with different FC-AL loops, such as FC-AL loops 285 and 295.

Figure 3:
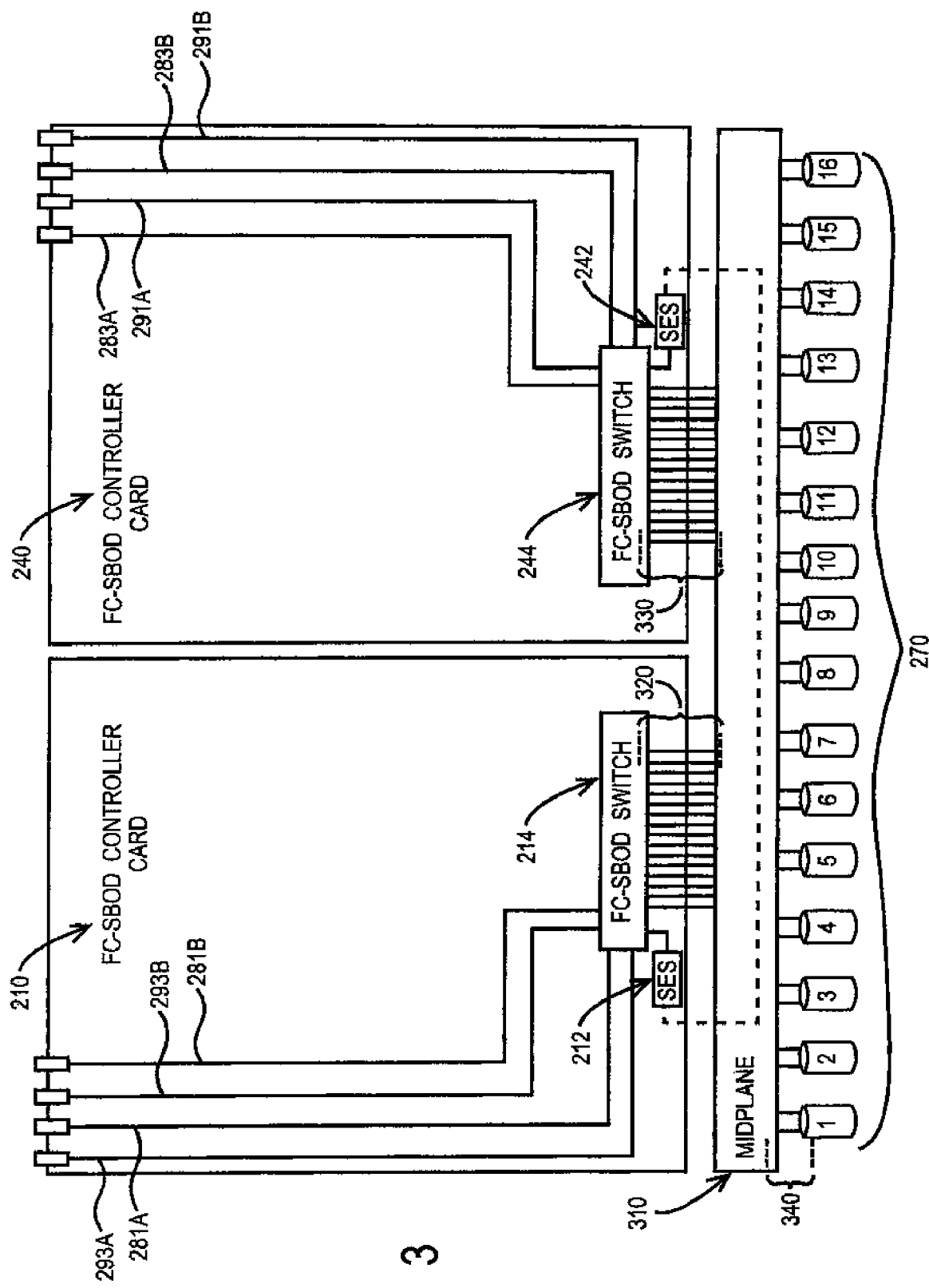
FIG. 3 is a block diagram showing a plurality of data storage devices interconnected to a fibre channel arbitrated loop switch.
Figure 4A:
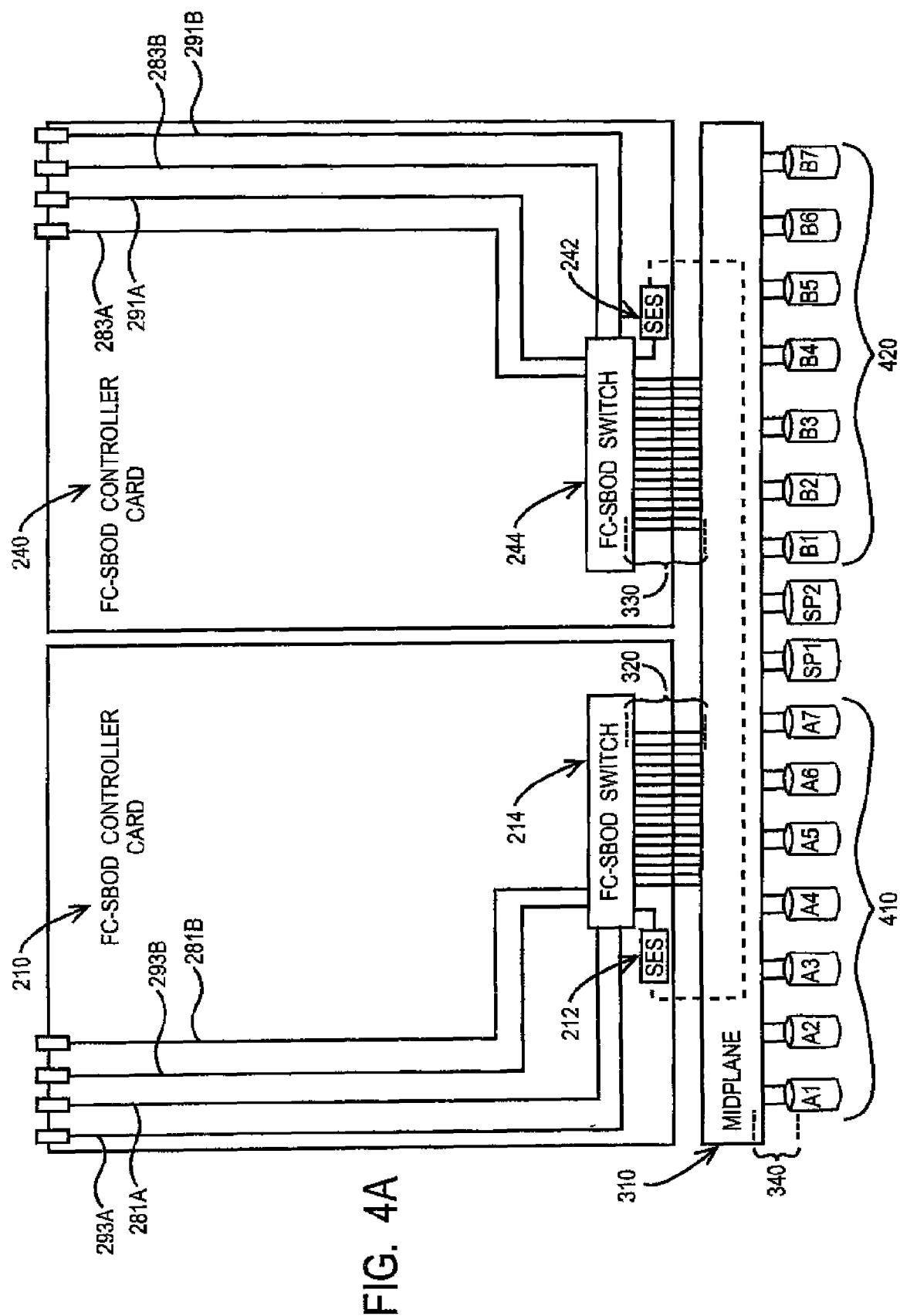
FIG. 4A is a block diagram showing the plurality of data storage devices of FIG. 3 configured in two storage arrays.

For example and referring to FIGS. 3 and 4A, data storage devices 1, 2, 3, 4, 5, 6, and 7, recited in FIG. 3 are configured into RAID array 410, wherein RAID array 410 comprises devices A1, A2, A3, A4, A5, A6, A7. In the illustrated embodiments of FIGS. 3 and 4A, data storage devices 10, 11, 12, 13, 14, 15, and 16, recited in FIG. 3 are configured into RAID array 420, wherein RAID array 420 comprises devices B1, B2, B3, B4, B5, B6, and B7. Data storage devices 8 and 9 are designated spare data storage devices SP1 and SP2.

In certain embodiments, RAID arrays are formed using a homogenous group of data storage devices of near-line technology class storage devices (SATA or FATA) These devices typically have lower reliability characteristics than RAID arrays formed of a homogeneous group of enterprise class storage devices. (FC-AL, SCSI, SAS). Due to online automated repair actions (RAID array hot spare taking) can result in a RAID array configuration where near-line technology class devices can be intermixed with the FC-AL devices as previously described, resulting in the problematic intermix of storage device technologies previously described having the accompanying difference in reliability characteristics of the various devices.

Figure 4B:
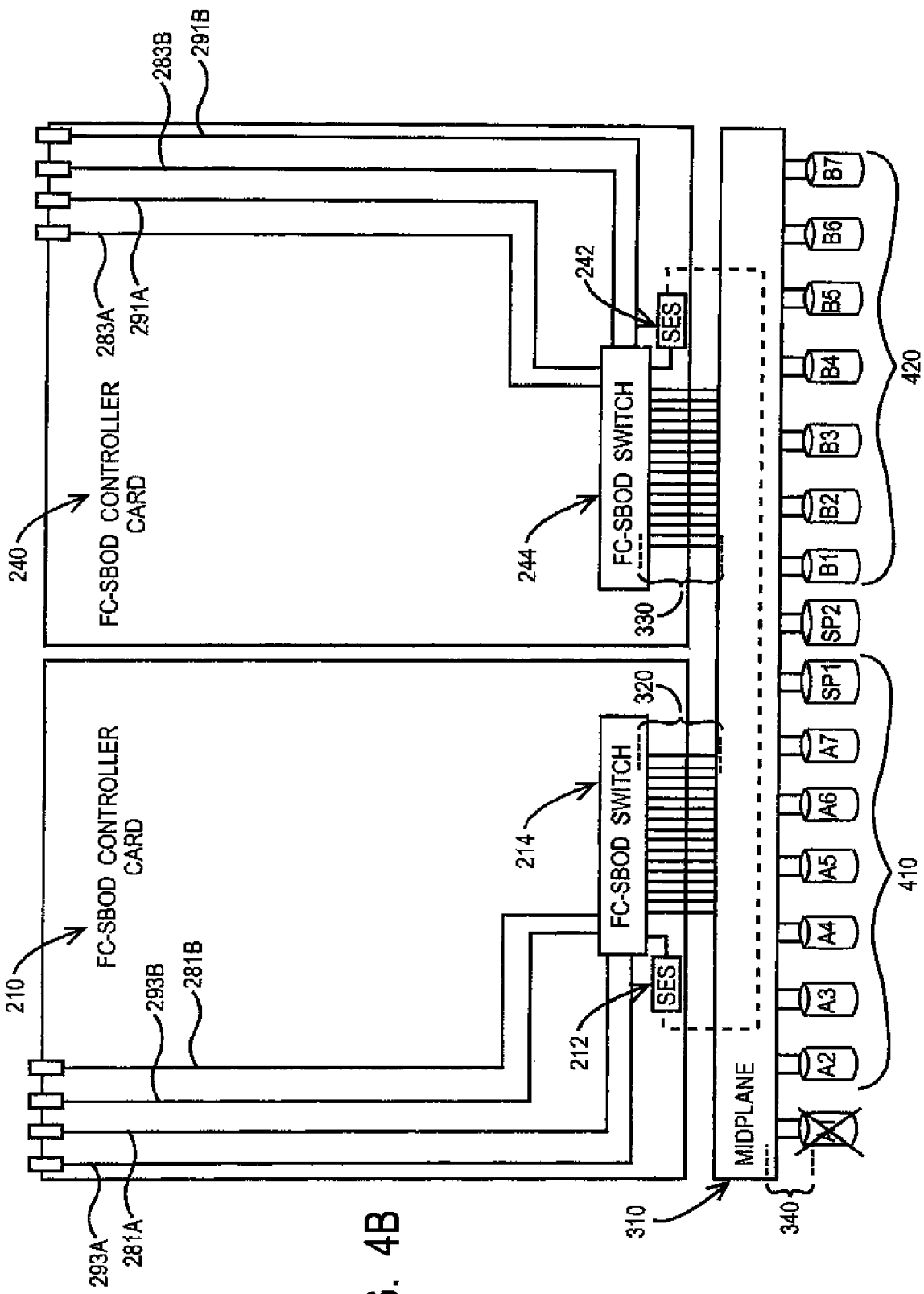
FIG. 4B is a block diagram showing a first reconfiguration of one of the storage arrays of FIG. 4A.
Figure 4C:
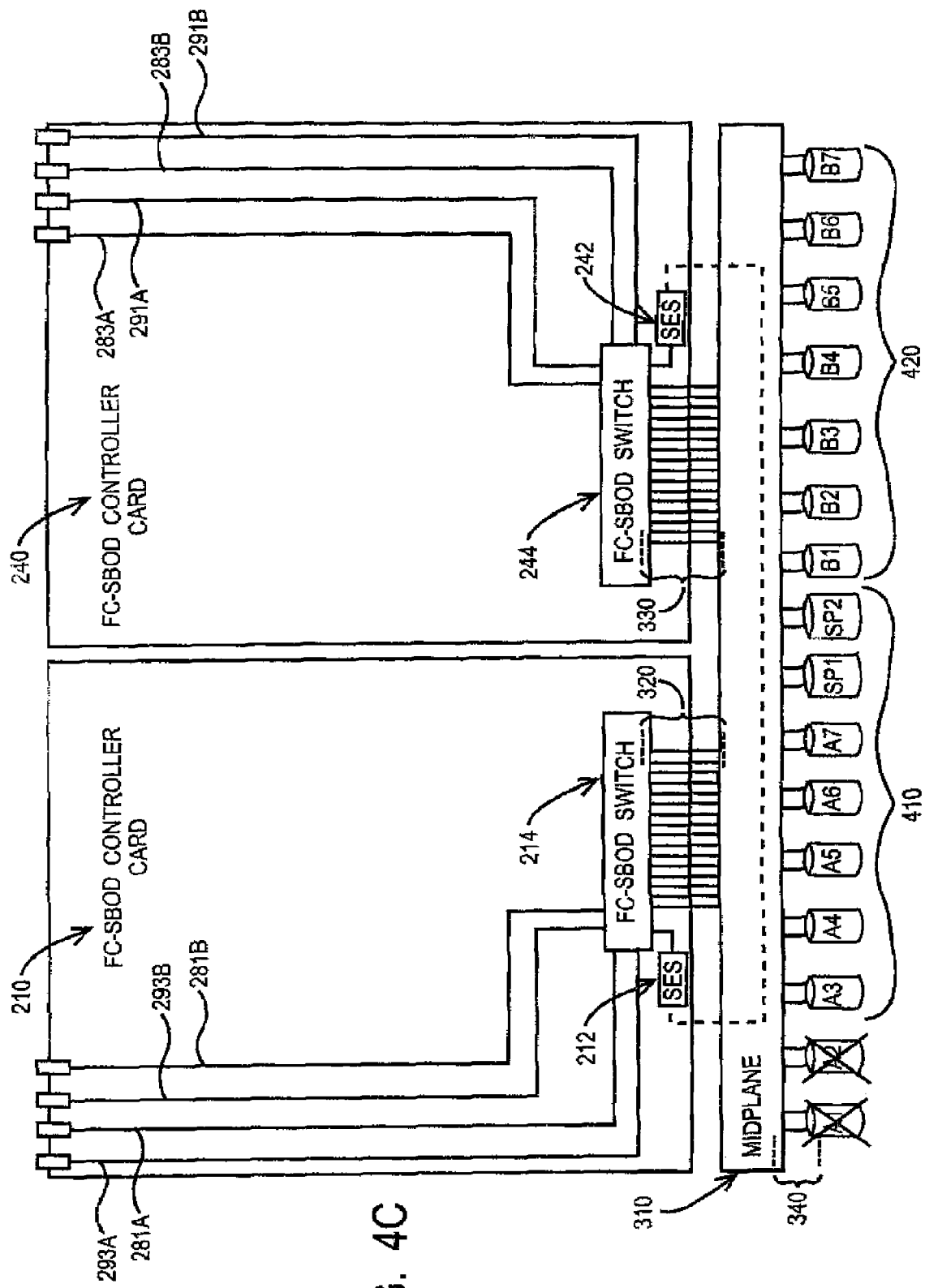
FIG. 4C is a block diagram showing a second reconfiguration of one of the storage arrays of FIG. 4A.

Referring now to FIG. 4B, in the event a device configured in RAID array 410, such as for example device A1, fails, then Applicants' apparatus and method reconfigure RAID array 410 to comprise devices A2, A3, A4, A5, A6, A7, and SP1. Referring now to FIG. 4C, in the event another device configured in RAID array 410, such as for example device A2, fails, then Applicants' apparatus and method reconfigure RAID array 410 to comprise devices A3, A4, A5, A6, A7, SP1, and SP2.

After repair of the failed device A1, wherein that repair may require removal of data storage device A1 from data storage system 100, repair, and reinstallation of data storage device A1 in system 100, Applicants' invention comprises a method to determine whether to designate the repaired and unassigned device A1 as a spare device, or whether to reconfigure a storage array to comprise that unassigned device A1.

More generally, upon the failure of a data storage device configured in a first one of a plurality of storage arrays, Applicants' apparatus and method reconfigure that first array to comprise a spare data storage device disposed in any of the plurality of storage arrays. Upon repair of the failed data storage device, Applicants' invention implements Applicants' method to determine whether to designated that repaired and unassigned data storage device as a spare device, or whether to reconfigure one or more storage arrays to comprise that unassigned device.

In storage systems that implement a storage array comprising a plurality of data storage devices, the reliability, performance, and efficiency, of the array is dependent upon the configuration of that array. For example, the reliability of RAID arrays is dependent upon the locations of the data storage devices comprising that array, and is further dependent on the failure modes of the communication network interconnecting that plurality of data storage device. Whether the array consists of a homogeneous technology class, or whether the array comprises a device technology intermix can also affect the reliability, performance and efficiency of the array.

For mirrored RAID types, including without limitation RAID 1, RAID 10 [RAID 1+0 and RAID 0+1] storage arrays, the reliability of that storage array is optimized when a network failure only impacts a single mirror of the mirrored pair. Therefore, the reliability of a mirrored RAID array type is optimal if, for each mirrored data storage device pair, one of the mirrored devices is interconnected with a first communication network and the other of the mirrored devices is interconnected with a second communication network. On the other hand, the reliability of a mirrored RAID array type is degraded if, for any mirrored data storage device pair, both of the mirrored devices are interconnected with the same communication network.

The reliability of a degraded mirrored RAID type array can be restored to optimal by first restoring the array to a homogeneous technology class, if necessary. Restoring the array to a homogeneous technology class can include reconfiguring the array to replace any storage device having a different technology specification than the technology specification of the majority of devices. For example, an array having a majority of FC-AL type devices can include a device in accordance with a FATA specification. To restore the array to a homogeneous technology class, the FATA device is removed and replaced with a FC-AL compliant device.

Next, the array is reconfigured to comprise one mirrored data storage device pair interconnected with the same communication network to deconfigure one of those data storage devices from the array and replace that deconfigured device with a data storage device interconnected with a different communication network. The reliability of a degraded mirrored RAID type array can be increased by reconfiguring that array comprising (N) mirrored data storage device pairs interconnected with the same communication network to delete from the array a data storage device disposed in one of those (N) mirrored pairs and replace that deleted device with a data storage device interconnected with a different communication network, wherein (N) is greater than or equal to 2.

For non-mirrored RAID types, including without limitation RAID 0, RAID 3, RAID 4, RAID 5, and RAID 6, the reliability of that array is optimized when the number of network failure modes are minimized. Therefore, the reliability of a non-mirrored RAID array type is optimal if each of the plurality of data storage devices comprising that array is interconnected to the same communication network. On the other hand, the reliability of a non-mirrored RAID array type is degraded if any of the plurality of data storage devices comprising that array are interconnected to different communication networks.

As the reliability of degraded non-mirrored RAID type arrays, like mirrored RAID arrays, is effected by the existence of a technology intermix, the reliability of a degraded non-mirrored RAID type array can be restored to optimal first be restoring the array to a homogeneous technology class. The reliability of a degraded non-mirrored RAID type array can be further restored to optimal by next reconfiguring that array comprising (M) data storage devices interconnected with a first communication network and one data storage device interconnected with a second communication network, to delete from the array the one device interconnected to the second communication network and replace that deleted device with a data storage device interconnected with the first communication network. The reliability of a degraded non-mirrored RAID type array can be increased by reconfiguring that array comprising (M) data storage devices interconnected with a first communication network and (P) data storage devices interconnected with a second communication network, to delete from the array one of the (P) data storage devices and replace that deleted device with a data storage device interconnected with the first communication network, wherein (M) is greater than (P), and wherein (P) is greater than or equal to 2.

For purposes of this Application, the performance of a RAID array is optimal if each data storage device configured in that array comprises the same operational speed and technology class. The performance of a RAID array is degraded if some of the data storage devices configured in that array comprise a first operational speed and the remaining data storage devices comprise a second operational speed, and/or some of the data storage devices comprise a first technology class, and remaining data storage devices comprise a second technology class. By "operational speed," Applicants mean an attribute selected from the group consisting of the storage device rotational speed, the device interface speed, and the like, where that attribute directly correlates to the data transfer rate of the data storage device. Because technology-intermixed arrays affect performance as well as reliability and efficiency, a first step to improve performance is to restore the array to a homogeneous technology class.

The performance of a RAID array comprising (Q) data storage devices, wherein (Q−1) of those data storage devices comprise a first operational speed and wherein the remaining data storage device comprises a second operational speed, can then be further restored to optimal by reconfiguring the array to replace the second operational speed device with a first operational speed device, wherein the second operational speed can be either less than, or greater than, the first operational speed.

The performance of a RAID array comprising (Q) data storage devices, wherein (Q−1) of those data storage devices comprise a first operational speed and the remaining data storage device comprises a second operational speed, wherein the difference between the first operational speed and the second operational speed comprises a first operational speed difference, can be increased by reconfiguring the array to replace the second operational speed device with a third operational speed device, wherein the difference between the first operational speed and the third operational speed comprises a second operational speed difference such that the absolute magnitude of the second operational speed difference is less than the absolute magnitude of the first operational speed difference. In addition, the performance of a RAID array comprising (Q) data storage device, wherein (Q−2) of those data storage devices comprise a first operational speed and the remaining two device comprise a second operational speed can be increased by reconfiguring that array to replace one of the second operational speed devices with a first operational speed device, wherein the second operational speed can be either less than, or greater than, the first operational speed.

For purposes of this Application, the efficiency of a RAID array is optimal if each of the data storage devices configured in that array comprises the same effective storage capacity. By "effective storage capacity," Applicants mean the storage capacity of the data storage device comprising the smallest storage capacity disposed in that RAID array.

Here, again, efficiency of a RAID array is effected by a technology intermix. As a result, a first step to restoring a RAID array to optimal efficiency includes restoring the array to a homogeneous technology class. The efficiency of a RAID array comprising (R) data storage devices, wherein (R−1) of those data storage devices comprise a first storage capacity and the remaining data storage device comprises a second storage capacity can then be further restored to optimal efficiency by reconfiguring the array to replace the second storage capacity device with a first storage capacity device, wherein the second storage capacity can be either less than or greater than the first storage capacity.

The efficiency of a RAID array comprising (R) data storage devices, wherein (R−1) of those data storage devices comprise a first storage capacity and the remaining data storage device comprises a second storage capacity, wherein the difference between the first storage capacity and the second storage capacity comprises a first capacity difference, can be increased by reconfiguring the array to replace the second storage capacity device with a third storage capacity device, wherein the difference between the first storage capacity and the third storage capacity comprises a second capacity difference such that the absolute magnitude of the second capacity difference is less than the absolute magnitude of the first capacity difference. In addition, the efficiency of a RAID array comprising (R) data storage devices, wherein (R−2) of those data storage devices comprise a first storage capacity and the remaining two data storage device comprise a second storage capacity can be increased by reconfiguring the array to replace one of the second storage capacity devices with a first storage capacity device.

Figure 8:
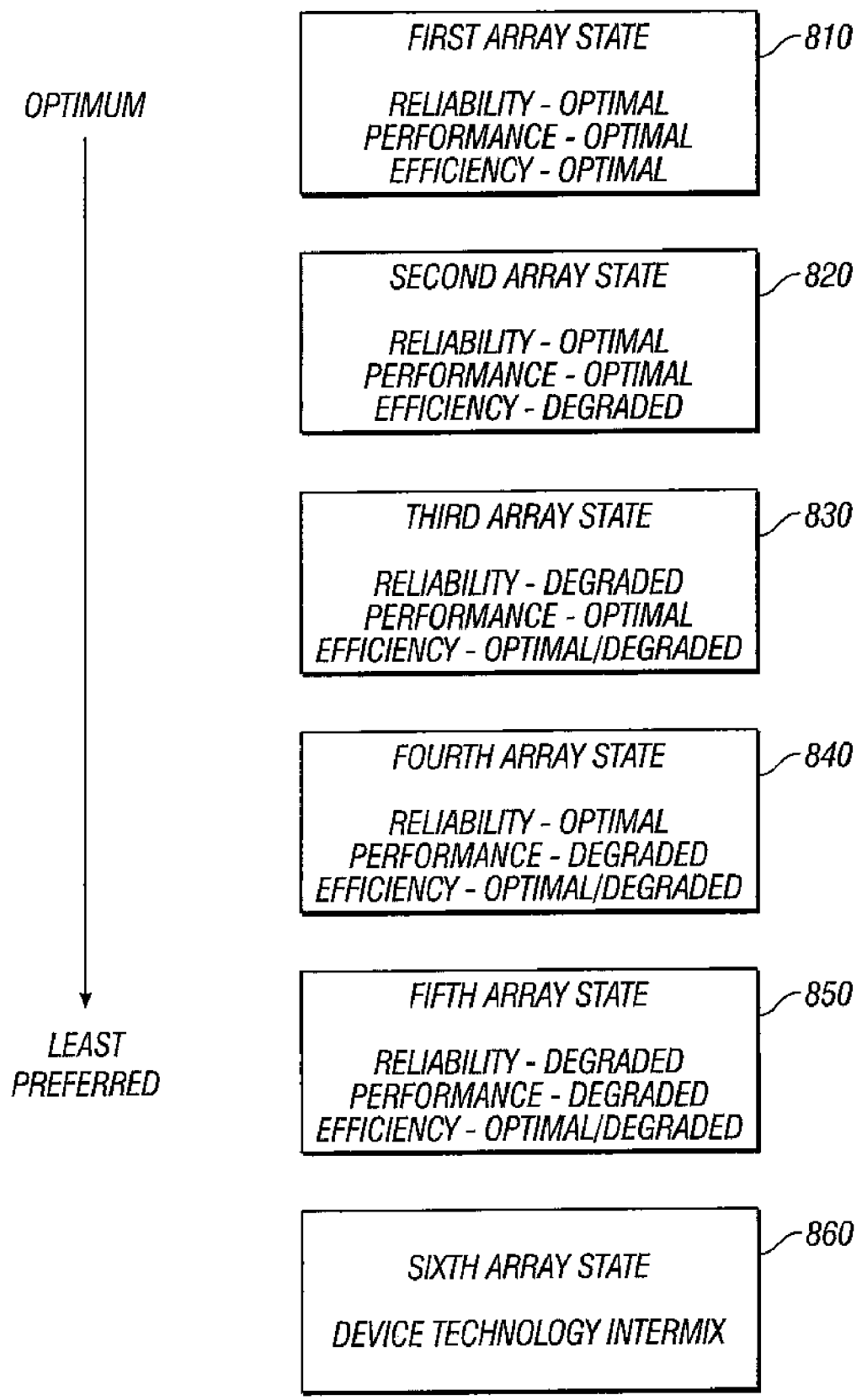
FIG. 8 is a block diagram showing Applicants' hierarchical ranking of storage array states.

Applicants' invention comprises a hierarchical preference order for storage array states, and implements that preference order in Applicants' method. FIG. 8 recites Applicants' hierarchical ranking of storage array states.

Referring now to FIG. 8, First Array State 810 comprise the optimal array state, wherein that array comprises optimal reliability, as defined herein, optimal performance, as defined herein, and optimal efficiency, as defined herein. Array states 820, 830, 840, and 850, comprise increasingly degraded array states. A storage array comprising the Second Array State 820 comprises optimal reliability and performance, but degraded efficiency, as defined herein. A storage array comprising the Third Array State 830 comprises optimal performance, but degraded efficiency and degraded reliability, as defined herein. A storage array comprising the Fourth Array State 840 comprises optimal reliability and efficiency, but degraded performance, as defined herein. A storage array comprising the Fifth Array State 850 comprises optimal efficiency, but degraded reliability and degraded efficiency and degraded reliability. Finally, a storage array comprising the Sixth Array State 860 includes a device technology intermix as previously described. A device technology intermix is least preferred since the intermix can contribute to each of the reliability, performance, and efficiency characteristics of the array.

As those skilled in the art will appreciate, RAID technology provides methods to automatically reconfigure an array of storage devices when a storage device configured in that RAID array fails. For example, it is known in the art to reconfigure a storage array comprising a failed device to include a spare data storage device in place of the failed device to restore the redundancy attributes of the storage array. A consequence of such a reconfiguration, the reconfigured storage array may comprise less than optimal reliability, and/or less than optimal performance, and/or less than optimal efficiency. Thereafter, the failed device may be repaired and/or replaced, and that unassigned repaired/replacement device is then made available.

Figure 5:
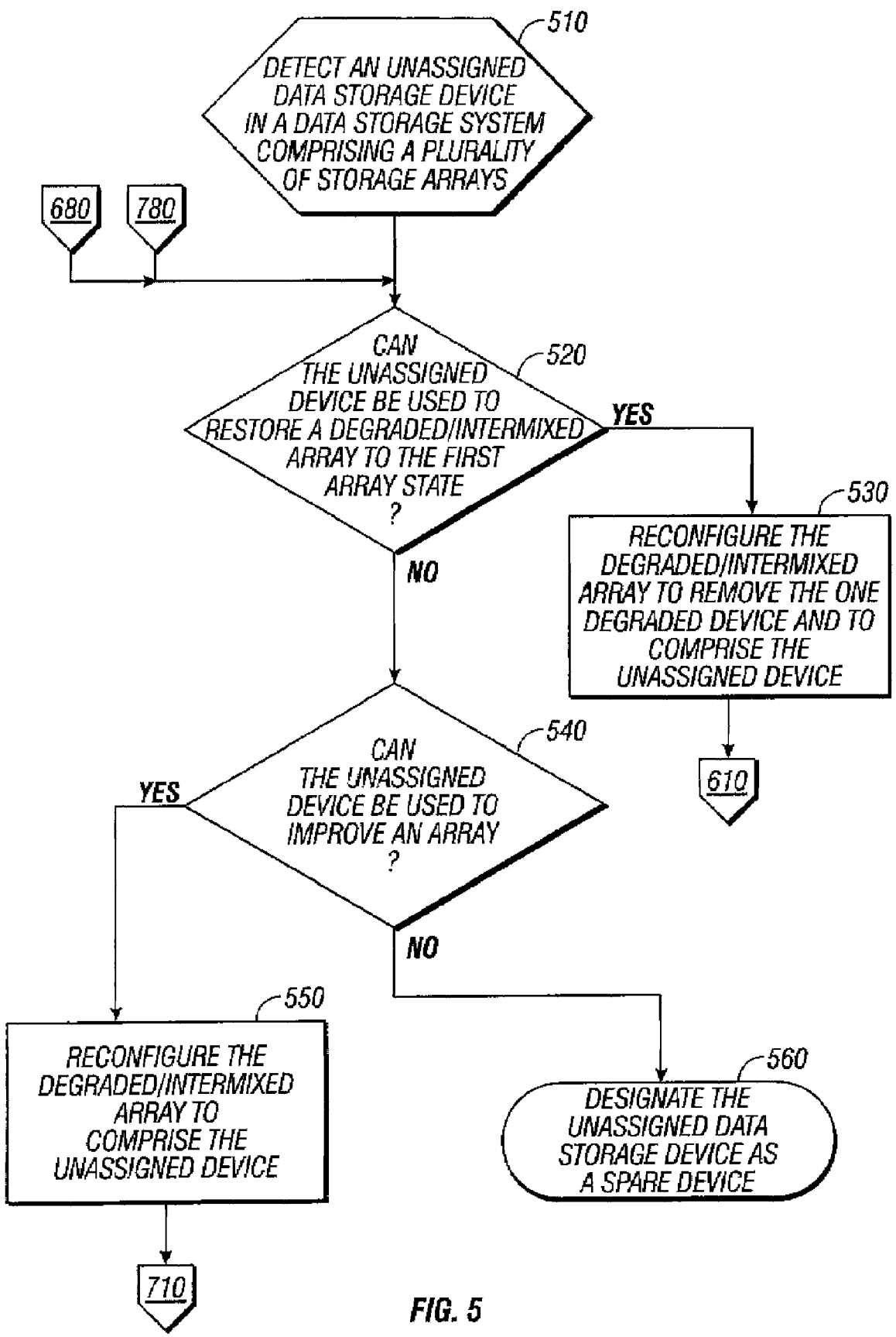
FIG. 5 is a flow chart summarizing certain steps of Applicants' method.

Applicants' invention comprises a method to detect such an unassigned device, and algorithmically determine a desirable utilization for that unassigned device. FIG. 5 summarizes certain steps of Applicants' method.

Referring now to FIG. 5, in step 510 Applicants' method installs, creates, and/or detects an unassigned data storage device in a data storage system, such as for example system 100, wherein that data storage system comprises a plurality of storage arrays. For purposes of this Application, that unassigned data storage device comprises optimal reliability, optimal performance, and optimal efficiency. For purposes of this Application, by "unassigned data storage device," Applicants' mean a data storage device not configured in any of the plurality of storage arrays as either an active data storage device or designated as a spare data storage device.

In step 520, Applicants' method determines if the unassigned device can restore to optimal reliability, optimal performance, and optimal efficiency a degraded storage array. By "degraded storage array," Applicants mean a storage array comprising one or more degraded data storage devices. By "degraded data storage device," Applicants mean a data storage device comprising degraded reliability, as defined herein, and/or degraded performance, as defined herein, and/or degraded efficiency, as defined herein. In order to restore a degraded storage array to optimal reliability, optimal performance, and optimal efficiency, using the unassigned data storage device the degraded array comprises one degraded data storage device.

In certain embodiments, step 520 is performed by a processor, such as processor 132 (FIGS. 1, 2) and/or processor 142 (FIGS. 1, 2) disposed in Applicants' data storage system 100 (FIG. 1).

Step 520 can also determine whether the storage array comprises a technology-intermixed array. By "intermixed array," Applicants refer to an array comprising devices compliant with more than one technological specification. For example, a processor 132 can make a determination that an array includes certain devices configured in an FC-AL specification, and certain devices configured in an FATA specification. The devices can be identified and located in the array as part of step 520. Processor 132 can calculate which devices in a certain technology class in a first array can be paired with devices in a certain technology class in a second array, so as to render the arrays homogeneous in technology specification.

If Applicants' method determines in step 520 that the unassigned data storage device can be used to restore a degraded or technology-intermixed storage array to optimal reliability, optimal performance, and optimal efficiency, then the method transitions from step 520 to step 530 wherein the method reconfigures the degraded or intermixed storage array to remove the degraded or intermixed data storage device and to include the unassigned data storage device, reconfiguring the array to a homogeneous technology class in the process. In certain embodiments, step 520 is performed by a processor, such as processor 132 (FIGS. 1, 2) and/or processor 142 (FIGS. 1, 2) disposed in Applicants' data storage system 100 (FIG. 1). In certain embodiments, steps 520 and 530 further comprise the steps recited in FIG. 6.

If Applicants' method determines in step 520 that the unassigned data storage device cannot be used to restore a storage array to optimal reliability, optimal performance, and optimal efficiency, then the method transitions from step 520 to step 540 wherein the method determines if the unassigned data storage device can be used to improve a degraded or intermixed data storage array. In certain embodiments, step 540 is performed by a processor, such as processor 132 (FIGS. 1, 2) and/or processor 142 (FIGS. 1, 2) disposed in Applicants' data storage system 100 (FIG. 1).

If Applicants' method determines in step 540 that the unassigned data storage device can improve a degraded or intermixed storage array, then the method transitions from step 540 to step 550 wherein the method reconfigures the degraded or intermixed storage array to remove a degraded or intermixed data storage device and to comprise the unassigned data storage device, again with the first priority of reconfiguring the array to a homogeneous technology class. In certain embodiments, step 550 is performed by a processor, such as processor 132 (FIGS. 1, 2) and/or processor 142 (FIGS. 1, 2) disposed in Applicants' data storage system 100 (FIG. 1). In certain embodiments, steps 540 and 550 further comprise the steps recited in FIG. 7.

If Applicants' method determines in step 540 that the unassigned data storage device cannot improve a degraded or intermixed storage array, then the method transitions from step 540 to step 560 wherein the method designates the unassigned data storage device as a spare device. In certain embodiments, step 560 is performed by a processor, such as processor 132 (FIGS. 1, 2) and/or processor 142 (FIGS. 1, 2) disposed in Applicants' data storage system 100 (FIG. 1).

In certain embodiments, the method of FIG. 5 is implemented by a data storage services provider to provide data storage services to one or more data storage services customers, wherein the data storage services provider receives client data from the one or more data storage services customers, and writes that data to one or more storage arrays disposed in a data storage system comprising two or more data storage arrays, wherein that data storage system is owned and/or operated by the data storage services provider.

Figure 6:
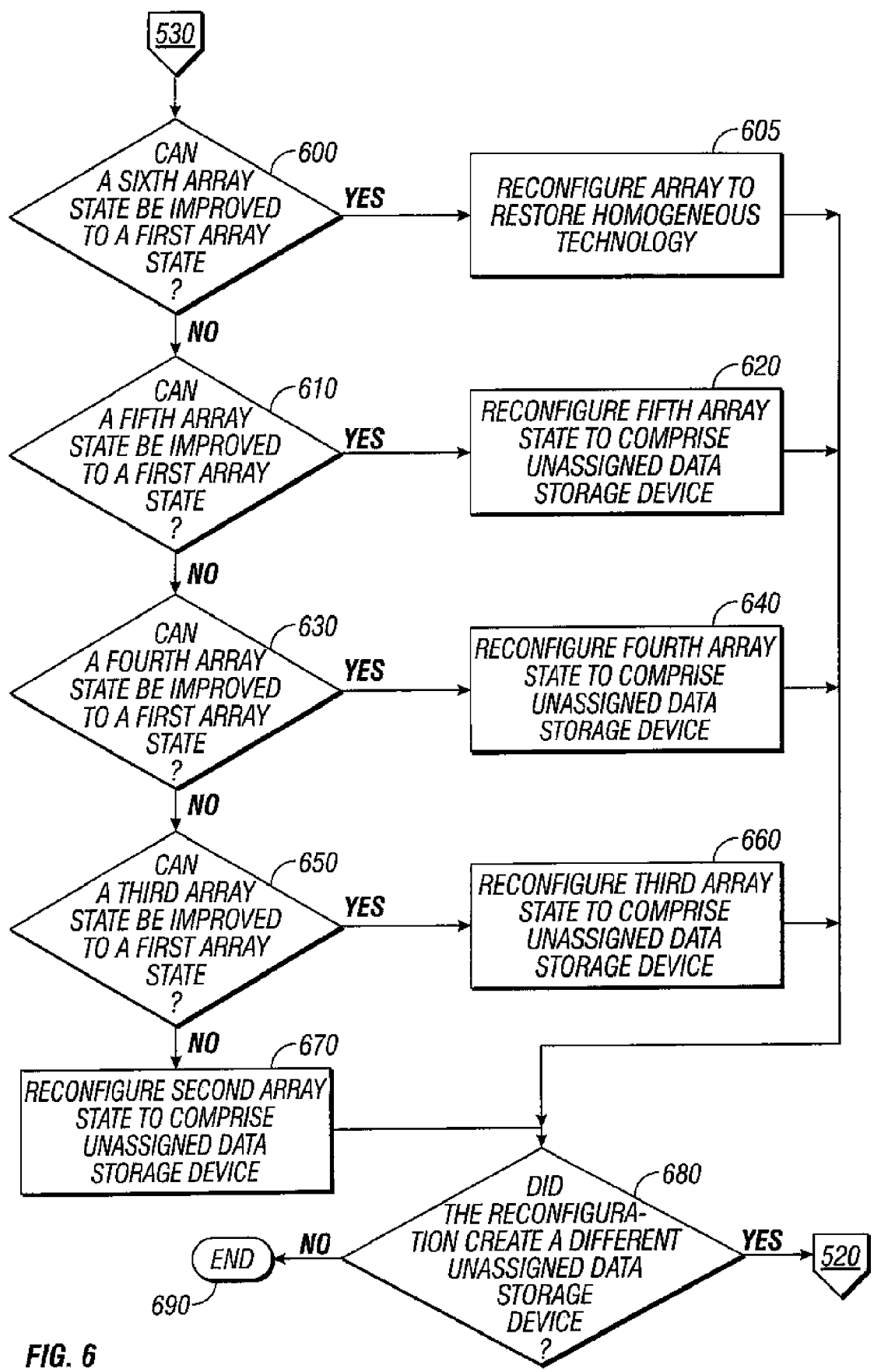
FIG. 6 is a flow chart summarizing certain additional steps of Applicants' method.

In certain embodiments of Applicants' method, steps 520 and 530 further comprise the steps recited in FIG. 6. Referring now to FIG. 6, in step 600, Applicants' method determines if an array comprising the Sixth Array State (FIG. 8) can be reconfigured using the unassigned data storage device to comprise the First Array State 810 (FIG. 8). In certain embodiments, step 600 is performed by a processor, such as processor 132 (FIGS. 1, 2) and/or processor 142 (FIGS. 1, 2) disposed in Applicants' data storage system 100 (FIG. 1).

If Applicants' method determines in step 600 that an intermixed array comprising the Sixth Array State 860 (FIG. 8) can be reconfigured using the unassigned data storage device to comprise the First Array State 810 (FIG. 8), then Applicants' method transitions from step 600 to 605 where the array is reconfigured using the unassigned data storage device to restore the array to a homogeneous technology class. In a separate embodiment, if a determination is made that an intermixed array is present, step 605 can repeat, utilizing a plurality of unassigned devices sharing a technology specification, to completely restore the array to a homogeneous technology class. In certain embodiments, step 605 is performed by a processor, such as processor 132 (FIGS. 1, 2) and/or processor 142 (FIGS. 1, 2) disposed in Applicants' data storage system 100 (FIG. 1). Applicants method transitions from step 605 to step 680.

If Applicant's method determines in step 600 that an intermixed array comprising the Sixth Array State 860 (FIG. 8) cannot be reconfigured using the unassigned data storage device to comprise the First Array State 810 (FIG. 8), then Applicant's method transitions from step 600 to step 610, wherein the method determines whether a degraded array comprising the Fifth Array State 850 (FIG. 8) can be reconfigured using the unassigned data storage device to comprise the First Array State 810 (FIG. 8). If so, then Applicants' method transitions from step 610 to step 620 wherein the method reconfigures the degraded storage array comprising the Fifth Array State to remove therefrom a degraded data storage device and to comprise the unassigned data storage device. In certain embodiments, step 620 is performed by a processor, such as processor 132 (FIGS. 1, 2) and/or processor 142 (FIGS. 1, 2) disposed in Applicants' data storage system 100 (FIG. 1). Applicants' method transitions from step 620 to step 680.

If Applicants' method determines in step 610 that a degraded array comprising the Fifth Array State 850 (FIG. 8) cannot be reconfigured using the unassigned data storage device to comprise the First Array State 810 (FIG. 8), then Applicants' method transitions from step 610 to step 630 wherein the method determines if a degraded array comprising the Fourth Array State 850 (FIG. 8) can be reconfigured using the unassigned data storage device to comprise the First Array State 810 (FIG. 8). In certain embodiments, step 610 is performed by a processor, such as processor 132 (FIGS. 1, 2) and/or processor 142 (FIGS. 1, 2) disposed in Applicants' data storage system 100 (FIG. 1).

If Applicants' method determines in step 630 that a degraded array comprising the Fourth Array State 840 (FIG. 8) can be reconfigured using the unassigned data storage device to comprise the First Array State 810 (FIG. 8), then Applicants' method transitions from step 630 to step 640 wherein the method reconfigures the array comprising the Fourth Array State 840 to comprise the unassigned data storage device. In certain embodiments, step 640 is performed by a processor, such as processor 132 (FIGS. 1, 2) and/or processor 142 (FIGS. 1, 2) disposed in Applicants' data storage system 100 (FIG. 1). Applicants' method transitions from step 640 to step 680.

If Applicants' method determines in step 630 that a degraded array comprising the Fourth Array State 850 (FIG. 8) cannot be reconfigured using the unassigned data storage device to comprise the First Array State 810 (FIG. 8), then Applicants' method transitions from step 630 to step 650 wherein the method determines if a degraded array comprising the Third Array State 830 (FIG. 8) can be reconfigured using the unassigned data storage device to comprise the First Array State 810 (FIG. 8). In certain embodiments, step 650 is performed by a processor, such as processor 132 (FIGS. 1, 2) and/or processor 142 (FIGS. 1, 2) disposed in Applicants' data storage system 100 FIG. 1).

If Applicants' method determines in step 650 that a degraded array comprising the Third Array State 830 (FIG. 8) can be reconfigured using the unassigned data storage device to comprise the First Array State 810 (FIG. 8), then Applicants' method transitions from step 650 to step 660 wherein the method reconfigures storage array comprising the Third Array State 830 (FIG. 8) to remove therefrom a degraded data storage device and to comprise the unassigned data storage device. In certain embodiments, step 660 is performed by a processor, such as processor 132 (FIGS. 1, 2) and/or processor 142 (FIGS. 1, 2) disposed in Applicants' data storage system 100 (FIG. 1). Applicants' method transitions from step 660 to step 680.

If Applicants' method determines in step 650 that a degraded array comprising the Third Array State 850 (FIG. 8) cannot be reconfigured using the unassigned data storage device to comprise the First Array State 810 (FIG. 8), then Applicants' method transitions from step 650 to step 670 wherein the method reconfigures a degraded array comprising the Second Array State 820 (FIG. 8) to remove there from a degraded data storage device and to comprise the unassigned data storage device. In certain embodiments, step 670 is performed by a processor, such as processor 132 (FIGS. 1, 2) and/or processor 142 (FIGS. 1, 2) disposed in Applicants' data storage system 100 (FIG. 1).

Applicants' method transitions from step 670 to step 680 wherein the method determines if a storage array reconfiguration has created a different unassigned data storage device, i.e. a data storage device not configured in a storage array and not designated a spare data storage device. For example, if a storage array is reconfigured in any of steps 620, 640, 660, or 670, to comprise the unassigned data storage device and to remove from the array a degraded data storage device, that degraded data storage device comprises a different unassigned device.

If Applicants' method detects in step 680 a different unassigned data storage device, then the method transitions from step 680 to step 520 and continues as described herein. Alternatively, if Applicants' method does not detect in step 680 a different unassigned data storage device, then the method transitions from step 680 to step 690 and ends.

Figure 7:
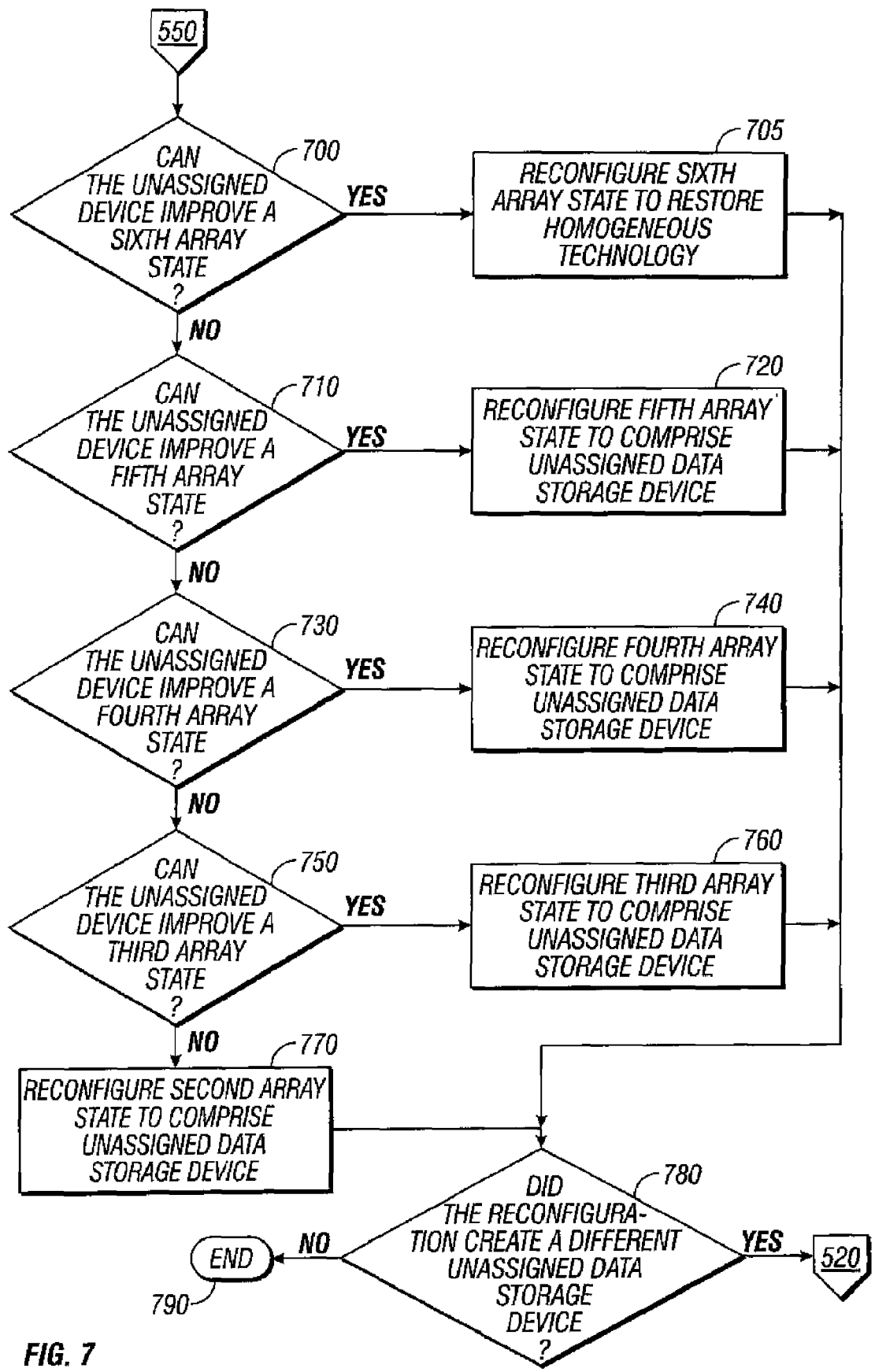
FIG. 7 is a flow chart summarizing certain additional steps of Applicants' method.

Referring once again to FIG. 5, in certain embodiments steps 540 and 550 further comprise the steps recited in FIG. 7. Referring now to FIG. 7, in step 700 Applicants' method determines if an unassigned device can improve an intermixed array comprising the Sixth Array State 860 (FIG. 8). If Applicants' method determines in step 700 that an intermixed array comprising the Sixth Array State 860 (FIG. 8) can be improved using the unassigned data storage device, then Applicants' method transitions from step 700 to step 705 wherein the method reconfigures the intermixed array to restore the array to a homogeneous technology class. In certain embodiments, step 705 is performed by a processor, such as processor 132 (FIGS. 1, 2) and/or processor 142 (FIGS. 1, 2) disposed in Applicants' data storage system 100 (FIG. 1). Applicants' method transitions from step 705 to step 780. Again, in certain embodiments, if a determination is made that an intermixed array is present, step 605 can repeat, utilizing a plurality of unassigned devices sharing a technology specification, to completely restore the array to a homogeneous technology class before transitioning to step 780.

If in step 700, Applicants' method determines that an unassigned device cannot be used to improve an intermixed array comprising the Sixth Array State 860 (FIG. 8), then Applicants' method transitions to step 710, wherein Applicants' method determines if a degraded array comprising the Fifth Array State 850 (FIG. 8) can be improved using the unassigned data storage device. If Applicants' method determines in step 710 that a degraded array comprising the Fifth Array State 850 (FIG. 8) can be improved using the unassigned data storage device, then Applicants' method transitions from step 710 to step 720 wherein the method reconfigures the degraded storage array comprising the Fifth Array State to remove a degraded data storage device and to comprise the unassigned data storage device. In certain embodiments, step 620 is performed by a processor, such as processor 132 (FIGS. 1, 2) and/or processor 142 (FIGS. 1, 2) disposed in Applicants' data storage system 100 (FIG. 1). Applicants' method transitions from step 720 to step 780.

If Applicants' method determines in step 710 that a degraded array comprising the Fifth Array State 850 (FIG. 8) cannot be improved using the unassigned data storage device, then Applicants' method transitions from step 710 to step 730 wherein the method determines if a degraded array comprising the Fourth Array State 840 (FIG. 8) can be improved using the unassigned data storage device. In certain embodiments, step 730 is performed by a processor, such as processor 132 (FIGS. 1, 2) and/or processor 142 (FIGS. 1, 2) disposed in Applicants' data storage system 100 (FIG. 1).

If Applicants' method determines in step 730 that a degraded array comprising the Fourth Array State 840 (FIG. 8) can be improved using the unassigned data storage device, then Applicants' method transitions from step 730 to step 740 wherein the method reconfigures the degraded storage array comprising the Fourth Array State to remove a degraded data storage device and to comprise the unassigned data storage device. In certain embodiments, step 740 is performed by a processor, such as processor 132 (FIGS. 1, 2) and/or processor 142 (FIGS. 1, 2) disposed in Applicants' data storage system 100 (FIG. 1). Applicants' method transitions from step 740 to step 780.

If Applicants' method determines in step 730 that a degraded array comprising the Fourth Array State 850 (FIG. 8) cannot be improved using the unassigned data storage device, then Applicants' method transitions from step 730 to step 750 wherein the method determines if a degraded array comprising the Third Array State 830 (FIG. 8) can be improved using the unassigned data storage device. In certain embodiments, step 830 is performed by a processor, such as processor 132 (FIGS. 1, 2) and/or processor 142 (FIGS. 1, 2) disposed in Applicants' data storage system 100 (FIG. 1).

If Applicants' method determines in step 750 that a degraded array comprising the Third Array State 830 (FIG. 8) can be improved using the unassigned data storage device, then Applicants' method transitions from step 750 to step 760 wherein the method reconfigures the degraded storage array comprising the Third Array State to remove a degraded data storage device and to comprise the unassigned data storage device. In certain embodiments, step 760 is performed by a processor, such as processor 132 (FIGS. 1, 2) and/or processor 142 (FIGS. 1, 2) disposed in Applicants' data storage system 100 (FIG. 1). Applicants' method transitions from step 760 to step 780.

If Applicants' method determines in step 750 that a degraded array comprising the Third Array State 850 (FIG. 8) cannot be improved using the unassigned data storage device, then Applicants' method transitions from step 750 to step 770 wherein the method reconfigures a degraded storage array comprising the Second Array State 820 (FIG. 8) to remove a degraded data storage device and to comprise the unassigned data storage device. In certain embodiments, step 770 is performed by a processor, such as processor 132 (FIGS. 1, 2) and/or processor 142 (FIGS. 1, 2) disposed in Applicants' data storage system 100 (FIG. 1).

Applicants' method transitions from step 770 to step 780 wherein the method determines if a storage array reconfiguration has created a different unassigned data storage device, i.e. a data storage device not configured in a storage array and not designated a spare data storage device. For example, if a storage array is reconfigured in any of steps 720, 740, 760, or 770, to comprise the unassigned data storage device and to remove from the array a degraded data storage device, that degraded data storage device comprises a different unassigned device.

If Applicants' method detects in step 780 a different unassigned data storage device, then the method transitions from step 780 to step 520 and continues as described herein. Alternatively, if Applicants' method does not detect in step 780 a different unassigned data storage device, then the method transitions from step 780 to step 790 and ends.

In certain embodiments, individual steps recited in FIGS. 5, 6, and/or 7, may be combined, eliminated, or reordered.

In certain embodiments, Applicants' data storage system comprises a computer useable medium having computer readable program code disposed therein to reconfigure one or more storage arrays disposed therein. In certain of these embodiments, Applicants' invention includes instructions residing memory 133 (FIG. 1) and/or memory 143 (FIG. 1), where those instructions are executed by a processor, such as processor 132 (FIGS. 1, 2) and/or 142 (FIGS. 1, 2), respectively, to perform one or more of steps 510, 520, 530, 540, 550, and/or 560, recited in FIG. 5, and/or one or more of steps 610, 620, 630, 640, 650, 660, 670, and/or 680, recited in FIG. 6, and/or one or more of steps 710, 720, 730, 740, 750, 760, 770, and/or 780, recited in FIG. 7.

In other embodiments, Applicants' invention includes instructions residing in any other computer program product, where those instructions are executed by a computer external to, or internal to, system 100, to perform steps one or more of steps 510, 520, 530, 540, 550, and/or 560, recited in FIG. 5, and/or one or more of steps 610, 620, 630, 640, 650, 660, 670, and/or 680, recited in FIG. 6, and/or one or more of steps 710, 720, 730, 740, 750, 760, 770, and/or 780, recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to reconfigure a storage array disposed in a data storage system, comprising the steps of:

supplying a data storage system comprising a plurality of data storage devices, wherein each of at least a portion of said plurality of data storage devices is assigned to one of a plurality of data storage arrays, or is assigned as a spare data storage device;

detecting an unassigned data storage device;

determining if any of said plurality of data storage arrays comprises an intermixed data storage array;

operative if any of said plurality of data storage devices comprises an intermixed data storage array, determining if said unassigned data storage device can be used to restore said intermixed data storage array to a homogeneous technology class;

operative if said unassigned data storage device can be used to restore said intermixed data storage array to a homogeneous technology class, reconfiguring said intermixed data storage array to a homogeneous technology class comprising said unassigned data storage device;

operative if any of said plurality of data storage arrays comprises a degraded data storage array, determining if said unassigned data storage device can be used to restore said degraded data storage array to optimal reliability, optimal performance, and optimal efficiency; and operative if said unassigned data storage device can be used to restore said degraded data storage array to an array comprising optimal reliability, optimal performance, and optimal efficiency, reconfiguring said degraded data storage array to comprise said unassigned data storage device.

2. The method of claim 1, further comprising the step of determining if reconfiguring said intermixed or degraded data storage array created a different unassigned data storage device.

3. The method of claim 1, further comprising the steps of:

operative if said unassigned data storage device cannot be used to restore a degraded array to optimal reliability, optimal performance, and optimal efficiency, determining if said unassigned data storage device can be used to increase the reliability, performance, or efficiency of a degraded data storage array; and operative if said unassigned data storage device can be used to increase the reliability, performance, or efficiency of said intermixed or degraded data storage array, reconfiguring said degraded data storage array to a homogeneous technology class comprising said unassigned data storage device.

4. The method of claim 3, further comprising the step of determining if reconfiguring said intermixed or degraded data storage array created a different unassigned data storage device.

5. The method of claim 3, further comprising the steps of:
operative if none of said plurality of data storage arrays comprises an intermixed or degraded data storage array, designating said unassigned data storage device as a spare data storage device; and
operative if said unassigned data storage device cannot be used to increase the reliability, performance, or efficiency of said intermixed or degraded data storage array, designating said unassigned data storage device as a spare data storage device.

6. The method of claim 1, further comprising the steps of:
determining if said unassigned data storage device can be used to restore an intermixed storage array comprising a plurality of technology-intermixed storage devices to a homogeneous technology class; and
operative if said unassigned data storage device can be used to restore an intermixed storage array comprising a plurality of technology-intermixed storage devices to a homogeneous technology class, reconfiguring said intermixed storage array comprising technology-intermixed storage devices to obtain a homogeneous technology class comprising said unassigned data storage device.

7. The method of claim 6, further comprising the steps of:
determining if said unassigned data storage device can be used to restore a degraded storage array comprising degraded reliability, degraded performance, and degraded efficiency to optimal reliability, optimal performance, and optimal efficiency;
operative if said unassigned data storage device can be used to restore a degraded storage array comprising degraded reliability, degraded performance, and degraded efficiency to optimal reliability, optimal performance, and optimal efficiency, reconfiguring said degraded array comprising degraded reliability, degraded performance, and degraded efficiency to comprise said unassigned data storage device;
operative if said unassigned data storage device cannot be used to restore a degraded storage array comprising degraded reliability, degraded performance, and degraded efficiency to optimal reliability, optimal performance, and optimal efficiency, determining if said unassigned data storage device can be used to restore a degraded storage array comprising optimal reliability, degraded performance, and degraded efficiency, to optimal reliability, optimal performance, and optimal efficiency; and
operative if said unassigned data storage device can be used to restore a degraded storage array comprising optimal reliability, degraded performance, and degraded efficiency to optimal reliability, optimal performance, and optimal efficiency, reconfiguring said degraded array comprising optimal reliability, degraded performance, and degraded efficiency to comprise said unassigned data storage device.

8. The method of claim 7, further comprising the steps of:
operative if said unassigned data storage device cannot be used to restore a degraded storage array comprising optimal reliability, degraded performance, and degraded efficiency to optimal reliability, optimal performance, and optimal efficiency, determining if said unassigned data storage device can be used to restore a degraded storage array comprising degraded reliability, optimal performance, and degraded efficiency, to optimal reliability, optimal performance, and optimal efficiency;
operative if said unassigned data storage device can be used to restore a degraded storage array comprising degraded reliability, optimal performance, and degraded efficiency to optimal reliability, optimal performance, and optimal efficiency, reconfiguring said degraded array comprising degraded reliability, optimal performance, and degraded efficiency to comprise said unassigned data storage device;
operative if said unassigned data storage device cannot be used to restore a degraded storage array comprising degraded reliability, optimal performance, and degraded efficiency to optimal reliability, optimal performance, and optimal efficiency, determining if said unassigned data storage device can be used to restore a degraded storage array comprising optimal reliability, optimal performance, and degraded efficiency, to optimal reliability, optimal performance, and optimal efficiency; and
operative if said unassigned data storage device can be used to restore a degraded storage array comprising optimal reliability, optimal performance, and degraded efficiency to optimal reliability, optimal performance, and optimal efficiency, reconfiguring said degraded storage array comprising optimal reliability, optimal performance, and degraded efficiency to comprise said unassigned data storage device.

9. The method of claim 3, further comprising the steps of:
operative if said unassigned data storage device can be used to increase the performance and/or the reliability and/or the efficiency of an intermixed storage array comprising technology-intermixed storage devices, reconfiguring said intermixed storage array to a homogeneous technology class comprising said unassigned data storage device;
operative if said unassigned data storage device cannot be used to restore a degraded storage array to optimal reliability, optimal performance, and optimal efficiency, determining if said unassigned data storage device can be used to increase the performance and/or the reliability and/or the efficiency of a degraded storage array comprising degraded reliability, degraded performance, and degraded efficiency;
operative if said unassigned data storage device can be used to increase the performance and/or the reliability and/or the efficiency of a degraded storage array comprising degraded reliability, degraded performance, and degraded efficiency, reconfiguring said degraded storage array comprising degraded reliability, degraded performance, and degraded efficiency to include said unassigned data storage device;
operative if said unassigned data storage device cannot be used to increase the performance and/or the reliability and/or the efficiency of a degraded storage array comprising degraded reliability, degraded performance, and degraded efficiency, determining if said unassigned data storage device can be used to increase the performance and/or efficiency of a degraded storage array comprising optimal reliability, degraded performance, and degraded efficiency; and
operative if said unassigned data storage device can be used to increase the performance and/or efficiency of a degraded storage array comprising optimal reliability, degraded performance, and degraded efficiency, reconfiguring said degraded storage array to comprise said unassigned data storage device.

10. The method of claim 9, further comprising the steps of:
operative if said unassigned data storage device cannot be used to increase the performance and/or efficiency of a degraded storage array comprising optimal reliability, degraded performance, and degraded efficiency, determining if said unassigned data storage device can be used to increase the reliability and/or the efficiency of a degraded storage array comprising degraded reliability, optimal performance, and degraded efficiency;

operative if said unassigned data storage device can be used to increase the reliability and/or the efficiency of a degraded storage array comprising degraded reliability, optimal performance, and degraded efficiency, reconfiguring said degraded storage array comprising degraded reliability, optimal performance, and degraded efficiency to include said unassigned data storage device;

operative if said unassigned data storage device cannot be used to increase the reliability and/or the efficiency of a degraded storage array comprising degraded reliability, optimal performance, and degraded efficiency, determining if said unassigned data storage device can be used to increase the efficiency of a degraded storage array comprising optimal reliability, degraded efficiency, and optimal performance; and operative if said unassigned data storage device can be used to increase the efficiency of a degraded storage array comprising optimal reliability, degraded efficiency, and optimal performance, reconfiguring said degraded storage array comprising optimal reliability, degraded performance to include said unassigned data storage device.

11. An article of manufacture comprising a computer useable medium having computer readable program code disposed therein to reconfigure a storage array disposed in a data storage system comprising a plurality of data storage devices, wherein each of said plurality of data storage devices is assigned to one of a plurality of data storage arrays, or is assigned as a spare data storage device, the computer readable program code comprising a series of computer readable program steps to effect:

detecting an unassigned data storage device;

determining if any of said plurality of data storage arrays comprises an intermixed or degraded data storage array;

operative if none of said plurality of data storage arrays comprises an intermixed or degraded data storage array, designating said unassigned data storage device as a spare data storage device;

operative if any of said plurality of data storage arrays comprises an intermixed data storage array, determining if said unassigned data storage device can be used to restore said intermixed data storage array to a homogeneous technology class, reconfiguring said intermixed data storage array to a homogeneous technology class comprising said unassigned data storage device;

operative if said unassigned data storage device can be used restore said degraded array to an array comprising optimal reliability, optimal performance, and optimal efficiency, reconfiguring said degraded data storage array to optimal reliability, optimal performance, and optimal efficiency;

operative if said unassigned data storage device can be used to increase the reliability, performance, or efficiency of said intermixed data storage array, reconfiguring said intermixed data storage array to a homogeneous technology class comprising said unassigned data storage device;

operative if said unassigned data storage can be used to increase the reliability performance, or efficiency of said degraded data storage array, reconfiguring said degraded data storage array to include said unassigned data storage device; and operative if said unassigned data storage device cannot be used to increase the reliability, performance, or efficiency of said degraded data storage array, designating said unassigned data storage device as a spare data storage device.

12. The article of manufacture of claim 11, wherein said article of manufacture comprises a data storage system comprising a plurality of data storage devices, wherein each of said plurality of data storage devices is assigned to one of a plurality of data storage arrays, or is assigned as a spare data storage device.

13. The article of manufacture of claim 11, said computer readable program code further comprising a series of computer readable program steps to effect:

determining if said unassigned data storage device can be used to restore an intermixed storage array comprising technology-intermixed storage devices to optimal reliability, optimal performance, and optimal efficiency; and operative if said unassigned data storage device can be used to restore an intermixed storage array comprising technology-intermixed storage devices to optimal reliability, optimal performance, and optimal efficiency, reconfiguring said intermixed storage array comprising technology-intermixed storage devices to obtain a homogeneous technology class comprising said unassigned data storage device;

operative if said unassigned data storage device cannot be used to restore an intermixed storage array comprising technology-intermixed storage devices to optimal reliability, optimal performance, and optimal efficiency, determining if said unassigned data storage device can be used to restore an intermixed storage array comprising technology-intermixed storage devices to optimal reliability, optimal performance, and optimal efficiency.

14. The article of manufacture of claim 13, said computer readable program code further comprising a series of computer readable program steps to effect:

determining if said unassigned data storage device can be used to restore a degraded storage array comprising degraded reliability, degraded performance, and degraded efficiency, to optimal reliability, optimal performance, and optimal efficiency;

operative if said unassigned data storage device can be used to restore a degraded storage array comprising degraded reliability, degraded performance, and degraded efficiency, to optimal reliability, optimal performance, and optimal efficiency, reconfiguring said degraded array comprising degraded reliability, degraded performance, and degraded efficiency to comprise said unassigned data storage device;

operative if said unassigned data storage device cannot be used to restore a degraded storage array comprising degraded reliability, degraded performance, and degraded efficiency, to optimal reliability, optimal performance, and optimal efficiency, determining if said unassigned data storage device can be used to restore a degraded storage array comprising optimal reliability, degraded performance, and degraded efficiency, to optimal reliability, optimal performance, and optimal efficiency; and operative if said unassigned data storage device can be used to restore a degraded storage array comprising optimal reliability, degraded performance, and degraded efficiency, to optimal reliability, optimal performance, and optimal efficiency, reconfiguring said degraded array comprising optimal reliability, degraded performance, and degraded efficiency to comprise said unassigned data storage device.

15. The article of manufacture of claim 14, said computer readable program code further comprising a series of computer readable program steps to effect:

operative if said unassigned data storage device cannot be used to restore a degraded storage array comprising optimal reliability, degraded performance, and degraded efficiency, to optimal reliability, optimal performance, and optimal efficiency, determining if said unassigned data storage device can be used to restore a degraded storage array comprising degraded reliability, optimal performance, and degraded efficiency, to optimal reliability, optimal performance, and optimal efficiency;

operative if said unassigned data storage device can be used to restore a degraded storage array comprising degraded reliability, optimal performance, and degraded efficiency, to optimal reliability, optimal performance, and optimal efficiency, reconfiguring said degraded array comprising degraded reliability, optimal performance, and degraded efficiency to comprise said unassigned data storage device;

operative if said unassigned data storage device cannot be used to restore a degraded storage array comprising degraded reliability, optimal performance, and degraded efficiency, to optimal reliability, optimal performance, and optimal efficiency, determining if said unassigned data storage device can be used to restore a degraded storage array comprising optimal reliability, optimal performance, and degraded efficiency, to optimal reliability, optimal performance, and optimal efficiency; and operative if said unassigned data storage device can be used to restore a degraded storage array comprising optimal reliability, optimal performance, and degraded efficiency, to optimal reliability, optimal performance, and optimal efficiency, reconfiguring said degraded storage array comprising optimal reliability, optimal performance, and degraded efficiency to comprise said unassigned data storage device.

16. The article of manufacture of claim 11, said computer readable program code further comprising a series of computer readable program steps to effect:

operative if said unassigned data storage device cannot be used to restore an intermixed storage array to optimal reliability, optimal performance, and optimal efficiency, determining if said unassigned data storage device can be used to increase the performance and/or the reliability and/or the efficiency of an intermixed storage array comprising technology-intermixed storage devices;

operative if said unassigned data storage device can be used to increase the performance and/or the reliability and/or the efficiency of an intermixed storage array comprising technology-intermixed storage devices, reconfiguring said intermixed storage array to comprise a homogeneous technology class including said unassigned data storage device;

operative if said unassigned data storage device cannot be used to restore a degraded storage array to optimal reliability, optimal performance, and optimal efficiency, determining if said unassigned data storage device can be used to increase the performance and/or the reliability and/or the efficiency of a degraded storage array comprising degraded reliability, degraded performance, and degraded efficiency;

operative if said unassigned data storage device can be used to increase the performance and/or the reliability and/or the efficiency of a degraded storage array comprising degraded reliability, degraded performance, and degraded efficiency, reconfiguring said degraded storage array comprising degraded reliability, degraded performance, and degraded efficiency to include said unassigned data storage device;

operative if said unassigned data storage device cannot be used to increase the performance and/or the reliability and/or the efficiency of a degraded storage array comprising degraded reliability, degraded performance, and degraded efficiency, determining if said unassigned data storage device can be used to increase the performance and/or efficiency of a degraded storage array comprising optimal reliability, degraded performance, and degraded efficiency; and operative if said unassigned data storage device can be used to increase the performance and/or efficiency of a degraded storage array comprising optimal reliability, degraded performance, and degraded efficiency, reconfiguring to comprise said unassigned data storage device said degraded storage array comprising optimal reliability, degraded performance, and degraded efficiency.

17. The article of manufacture of claim 16, said computer readable program code further comprising a series of computer readable program steps to effect:

operative if said unassigned data storage device cannot be used to increase the performance and/or efficiency of a degraded storage array comprising optimal reliability, degraded performance, and degraded efficiency, determining if said unassigned data storage device can be used to increase the reliability and/or the efficiency of a degraded storage array comprising degraded reliability, optimal performance, and degraded efficiency;

operative if said unassigned data storage device can be used to increase the reliability and/or the efficiency of a degraded storage array comprising degraded reliability, optimal performance, and degraded efficiency, reconfiguring said degraded storage array comprising degraded reliability, optimal performance, and degraded efficiency to include said unassigned data storage device;

operative if said unassigned data storage device cannot be used to increase the reliability and/or the efficiency of a degraded storage array comprising degraded reliability, optimal performance, and degraded efficiency, determining if said unassigned data storage device can be used to increase the efficiency of a degraded storage array comprising optimal reliability, degraded efficiency, and optimal performance;

operative if said unassigned data storage device can be used to increase the efficiency of a degraded storage array comprising optimal reliability, degraded efficiency, and optimal performance, reconfiguring said degraded storage array comprising optimal reliability, degraded performance to include said unassigned data storage device;

determining if said unassigned data storage device can be used to restore a degraded storage array comprising degraded reliability, degraded performance, and degraded efficiency, to optimal reliability, optimal performance, and optimal efficiency;

operative if said unassigned data storage device can be used to restore a degraded storage array comprising degraded reliability, degraded performance, and degraded efficiency, to optimal reliability, optimal performance, and optimal efficiency, reconfiguring said degraded array comprising degraded reliability, degraded performance, and degraded efficiency to comprise said unassigned data storage device;

operative if said unassigned data storage device cannot be used to restore a degraded storage array comprising degraded reliability, degraded performance, and degraded efficiency, to optimal reliability, optimal performance, and optimal efficiency, determining if said unassigned data storage device can be used to restore a degraded storage array comprising optimal reliability, degraded performance, and degraded efficiency, to optimal reliability, optimal performance, and optimal efficiency; and operative if said unassigned data storage device can be used to restore a degraded storage array comprising optimal reliability, degraded performance, and degraded efficiency, to optimal reliability, optimal performance, and optimal efficiency, reconfiguring said degraded array comprising optimal reliability, degraded performance, and degraded efficiency to comprise said unassigned data storage device.

18. A computer program product usable with a programmable computer processor having computer readable program code embodied therein to reconfigure a storage array disposed in a data storage system comprising a plurality of data storage devices, wherein each of said plurality of data storage devices is assigned to one of a plurality of data storage arrays, or is assigned as a spare data storage device, the computer readable program code, when executed by a processor, cause the processor to perform a method comprising the steps of:

detecting an unassigned data storage device;

determining if any of said plurality of data storage arrays comprises an intermixed or degraded data storage array;

if any of said plurality of data storage arrays comprises an intermixed or degraded data storage array, determining if said unassigned data storage device can be used to restore said intermixed or degraded data storage array to optimal reliability, optimal performance, and optimal efficiency;

if said unassigned data storage device can be used restore said intermixed or degraded array to an array comprising optimal reliability, optimal performance, and optimal efficiency, reconfiguring said degraded data storage array to a homogeneous technology class comprising said unassigned data storage device;

if said unassigned data storage device cannot be used to restore an intermixed or degraded array to optimal reliability, optimal performance, and optimal efficiency, determining if said unassigned data storage device can be used to increase the reliability, performance, or efficiency of an intermixed or degraded data storage array; and if said unassigned data storage device can be used to increase the reliability, performance, or efficiency of said degraded data storage array, reconfiguring said degraded data storage array to a homogeneous technology class comprising said unassigned data storage device.

19. The computer program product of claim 18, further comprising computer readable program code that causes the processor to perform the steps of:

if none of said plurality of data storage arrays comprises an intermixed or degraded data storage array, designating said unassigned data storage device as a spare data storage device; and if said unassigned data storage device cannot be used to increase the reliability, performance, or efficiency of said intermixed or degraded data storage array, designating said unassigned data storage device as a spare data storage device.

20. The computer program product of claim 18, further comprising computer readable program code that causes the processor to perform the steps of:

determining if said unassigned data storage device can be used to restore an intermixed storage array comprising a plurality of technology-intermixed storage devices, to a homogeneous technology class;

if said unassigned data storage device can be used to restore an intermixed storage array comprising a plurality of technology-intermixed storage devices, to a homogenous technology class, reconfiguring said intermixed storage array to a homogenous technology class comprising said unassigned data storage device;

if said unassigned data storage device cannot be used to restore an intermixed storage array comprising a plurality of technology-intermixed storage devices to a homogeneous technology class, determining if said unassigned data storage device can be used to restore a degraded storage array comprising degraded reliability, degraded performance, and degraded efficiency, to optimal reliability, optimal performance, and optimal efficiency;

if said unassigned data storage device can be used to restore a degraded storage array comprising degraded reliability, degraded performance, and degraded efficiency, to optimal reliability, optimal performance, and optimal efficiency, reconfiguring said degraded array comprising degraded reliability, degraded performance, and degraded efficiency to comprise said unassigned data storage device;

if said unassigned data storage device cannot be used to restore a degraded storage array comprising degraded reliability, degraded performance, and degraded efficiency, to optimal reliability, optimal performance, and optimal efficiency, determining if said unassigned data storage device can be used to restore a degraded storage array comprising optimal reliability, degraded performance, and degraded efficiency, to optimal reliability, optimal performance, and optimal efficiency; and if said unassigned data storage device can be used to restore a degraded storage array comprising optimal reliability, degraded performance, and degraded efficiency, to optimal reliability, optimal performance, and optimal efficiency,reconfiguring said degraded array comprising optimal reliability, degraded performance, and optimal efficiency to comprise said unassigned data storage device.

* * * * *